Figure 5:
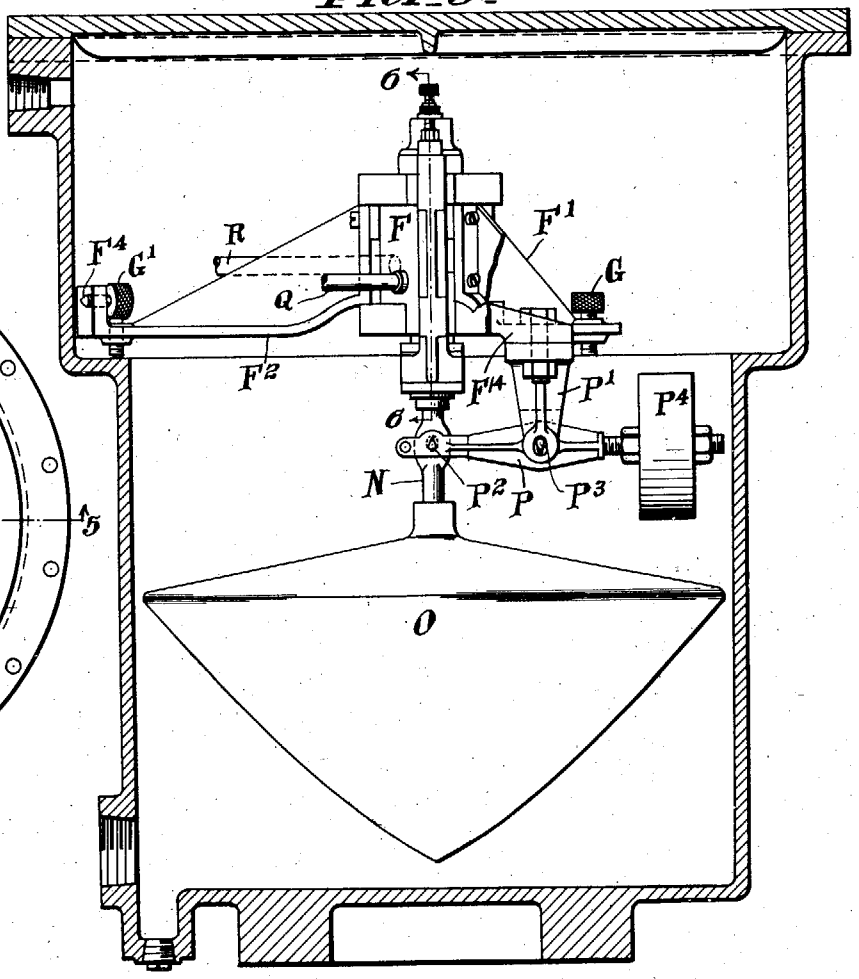

G. H. GIBSON.
BALANCING AND MEASURING APPARATUS.
APPLICATION FILED APR. 1, 1916.
Reissued Oct. 24, 1916.
14,206.
5 SHEETS—SHEET 1.
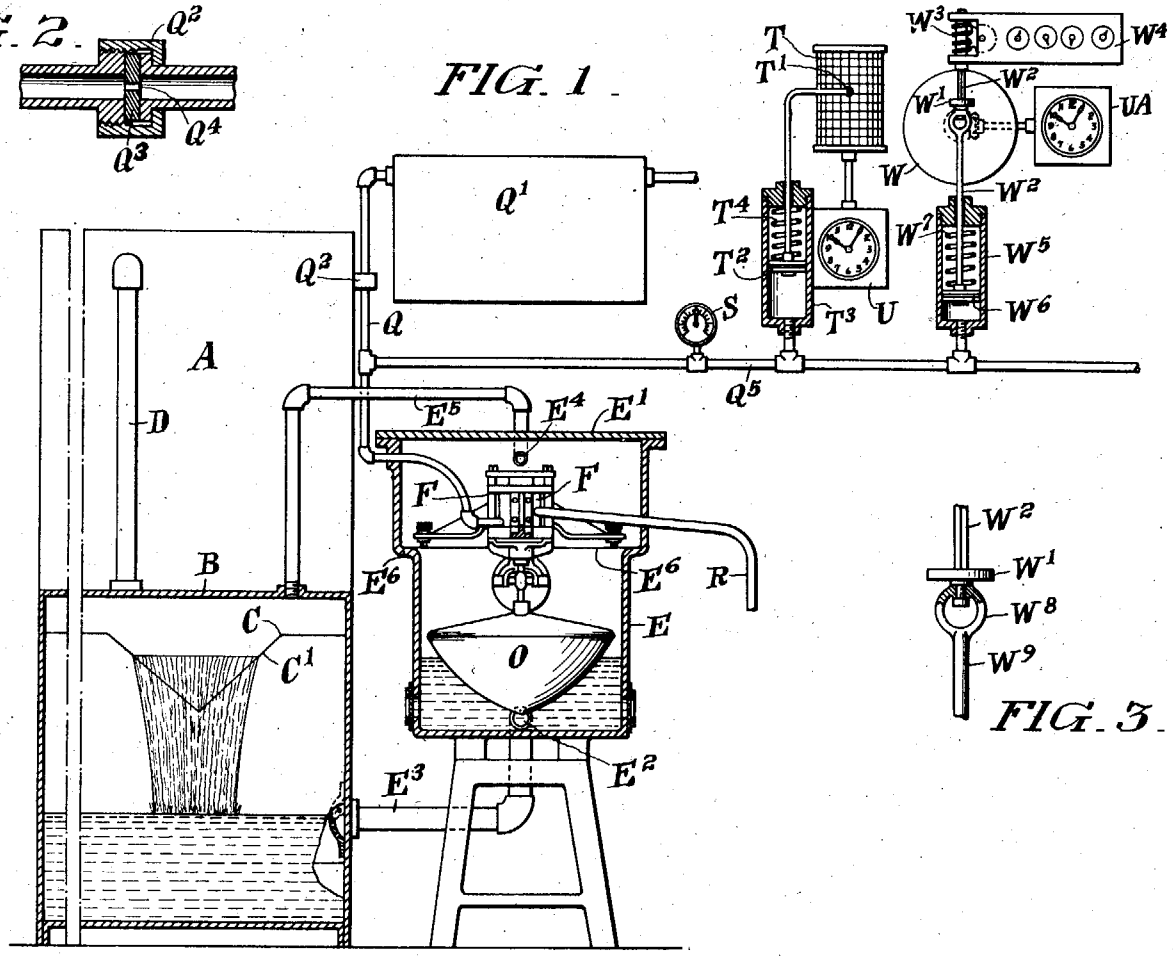
Witness
Daniel Webster Jr.
Inventor
George H. Gibson
By Francis T. Chambers
his Attorney

G. H. GIBSON.

BALANCING AND MEASURING APPARATUS.

APPLICATION FILED APR. 1, 1916.

Reissued Oct. 24, 1916.

14,206.

5 SHEETS—SHEET 2.

Witness

Daniel Webster Jr.

Inventor

George H. Gibson

By Frank T. R. Lambert

Attorney

G. H. GIBSON.

BALANCING AND MEASURING APPARATUS.

APPLICATION FILED APR. 1, 1916.

Reissued Oct. 24, 1916.

14,206.

5 SHEETS—SHEET 3.

Inventor

George H. Gibson

Witness

Daniel Webster Jr.

By James T. Chambers his Attorney

G. H. GIBSON.

BALANCING AND MEASURING APPARATUS.

APPLICATION FILED APR. 1, 1916.

Reissued Oct. 24, 1916.

14,206.

5 SHEETS—SHEET 4.

Witness

Daniel Webster Jr.

Inventor

George H. Gibson

By

James T. Chamberlin his Attorney

G. H. GIBSON.

BALANCING AND MEASURING APPARATUS.

APPLICATION FILED APR. 1, 1916.

Reissued Oct. 24, 1916.

14,206.

5 SHEETS—SHEET 5.

Witness

Daniel Webster, Jr.

INVENTOR

George H. Gibson

By James T. Chambers his Attorney

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, A FIRM DOING BUSINESS AS HARRISON SAFETY BOILER WORKS.

BALANCING AND MEASURING APPARATUS.

14,206. Specification of Reissued Letters Patent. Reissued Oct. 24, 1916.

Original No. 1,160,275, dated November 16, 1915, Serial No. 670,863, filed January 12, 1912. Application for reissue filed April 1, 1916. Serial No. 88,392.

*To all whom it may concern:*

Be it known that I, GEORGE H. GIBSON, a citizen of the United States of America, residing in Montclair, county of Essex, in the State of New Jersey, have invented certain new and useful Improvements in Balancing and Measuring Apparatus, of which the following is a true and exact description, reference being had to the accompanying drawings, which form a part thereof.

My present invention consists in novel means for balancing a variable force which are particularly adapted for use in flow measuring apparatus, and the primary object of my invention is to provide simple, reliable and effective apparatus for determining the quantity rate of flow of a liquid over or through a weir.

The present invention is of especial utility in measuring the flow of a liquid through a weir chamber in which the pressure of the vapors or gases above the liquid is different from that of the atmosphere.

In some of its aspects the present invention is to be regarded as an improvement on the invention disclosed and claimed in my prior Patent 1,015,556, granted January 23rd, 1912. In other aspects, however, the invention is not limited in all of its features to use in liquid flow measuring apparatus or in any kind of measuring apparatus.

The quantity rate of flow over or through a weir is in general a function of the pressures prevailing on the two sides of the weir, and where the discharge of a liquid over or through the weir is not opposed by hydrostatic pressure on the discharge side of the weir, is a function of the hydrostatic pressure or head on the supply side of the weir, but, in general, is not directly proportional to such hydrostatic pressure or head. For instance, where a liquid flows through a V-shaped weir orifice or through a series of V-shaped orifices having their apices at a common level, with a free discharge therethrough, the quantity rate of flow is approximately proportional to the five halves power of the height $h$ of liquid level on the supply side of the weir above the weir notch apex level, *i. e.* to $h^{5/2}$. The improved apparatus which I employ for measuring the quantity rate of flow over or through a weir preferably includes provisions for obtaining direct readings in quantity units of measurement, which may be indicated or recorded, or both, and for integrating and registering these results.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described forms in which my invention may be embodied.

Figure 4:
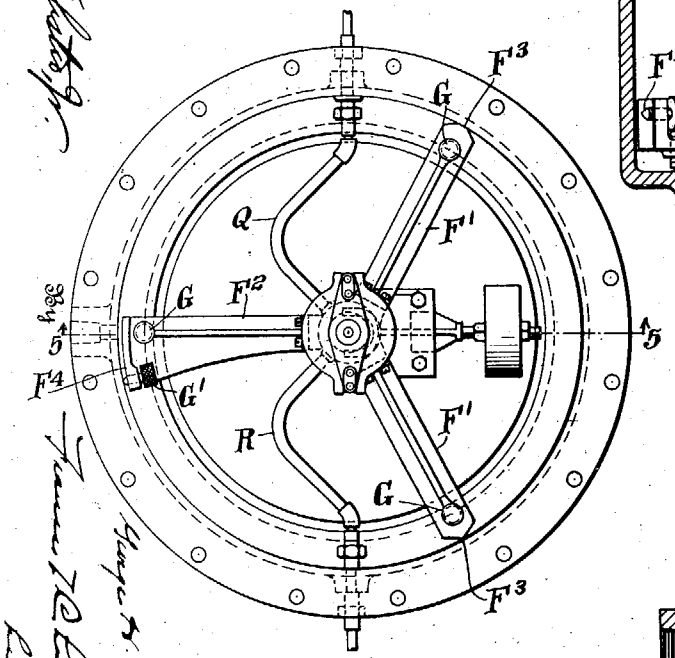
Figure 6:
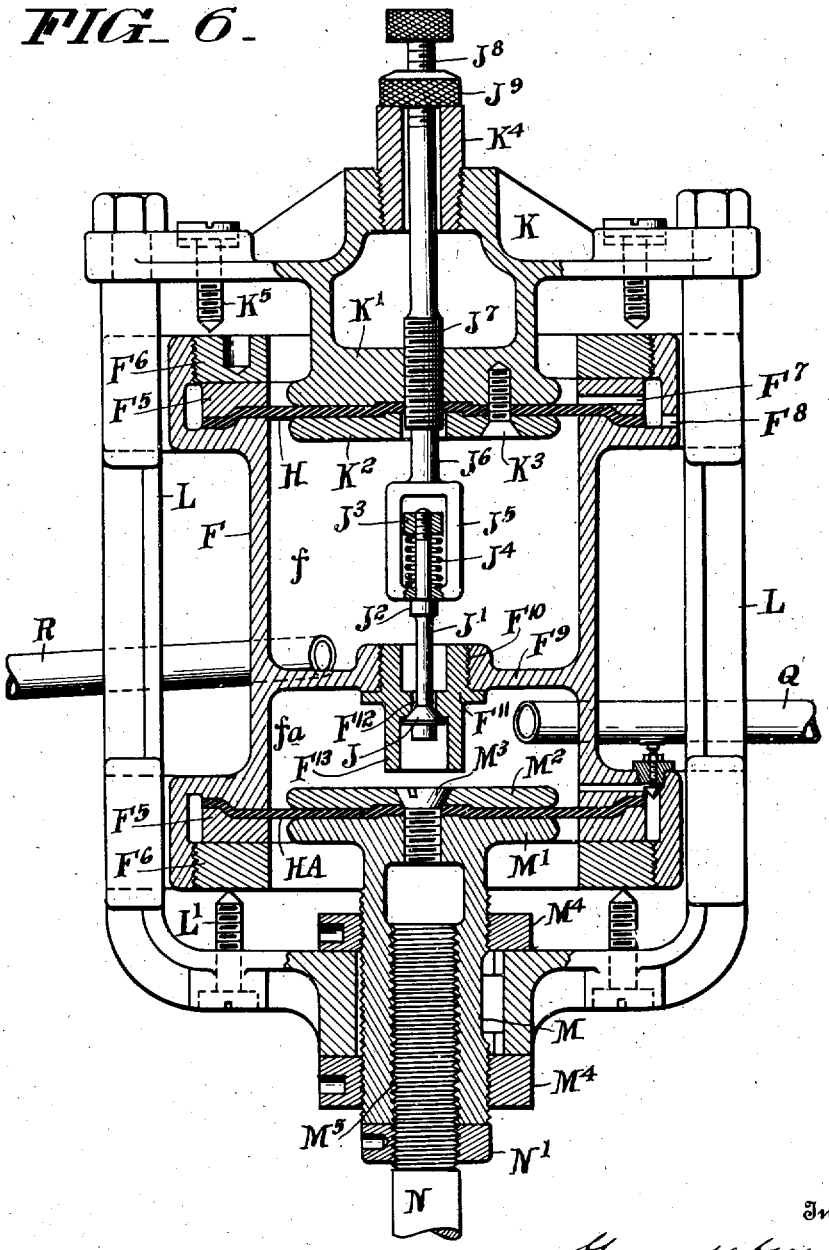
Figure 7:
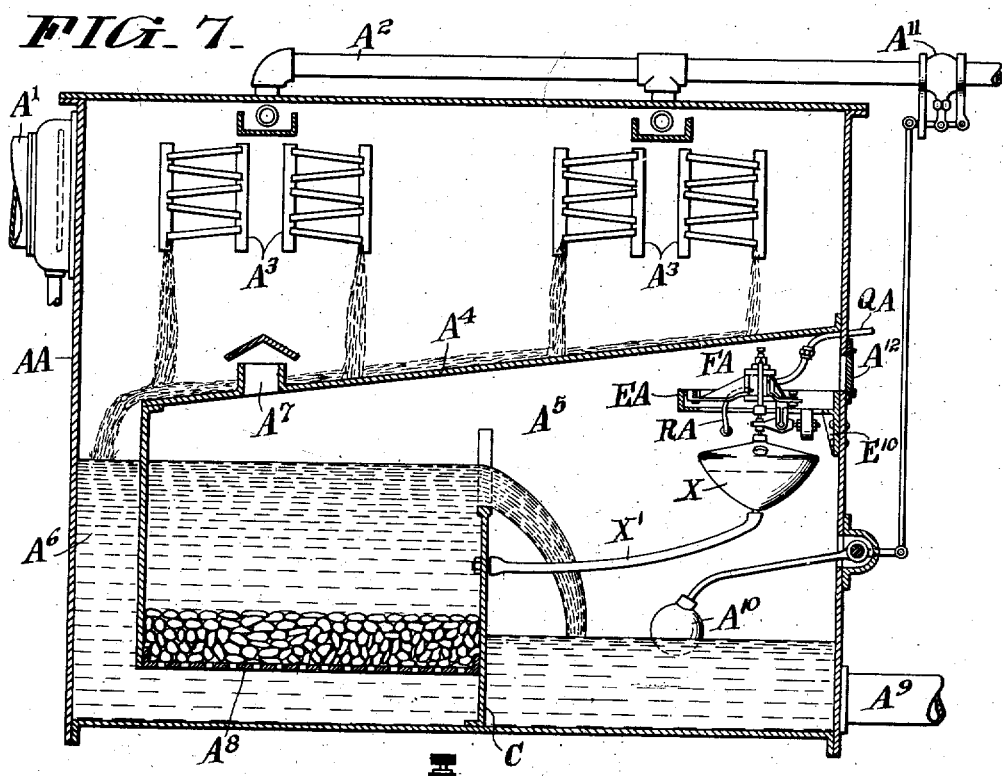
Figure 8:
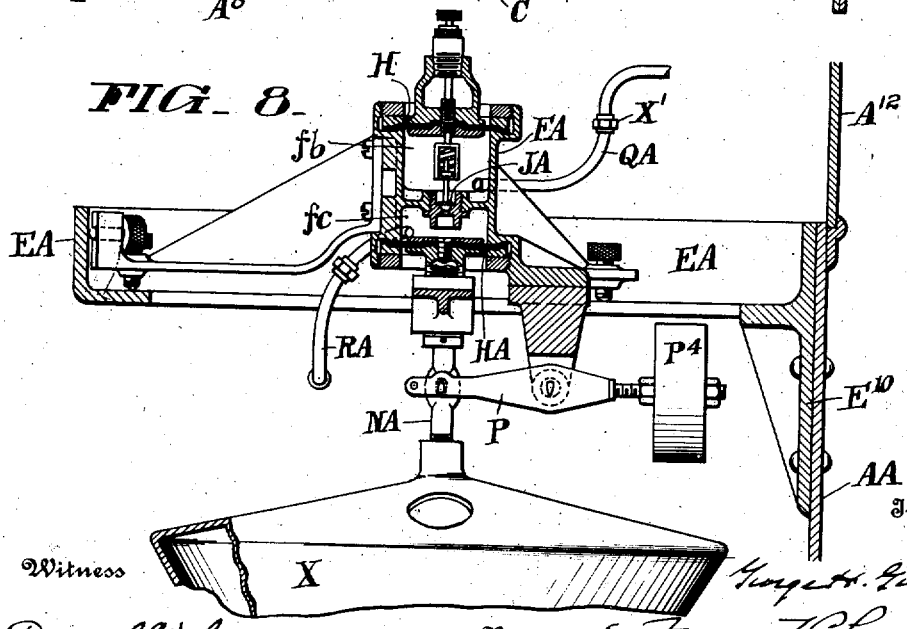
Figure 9:
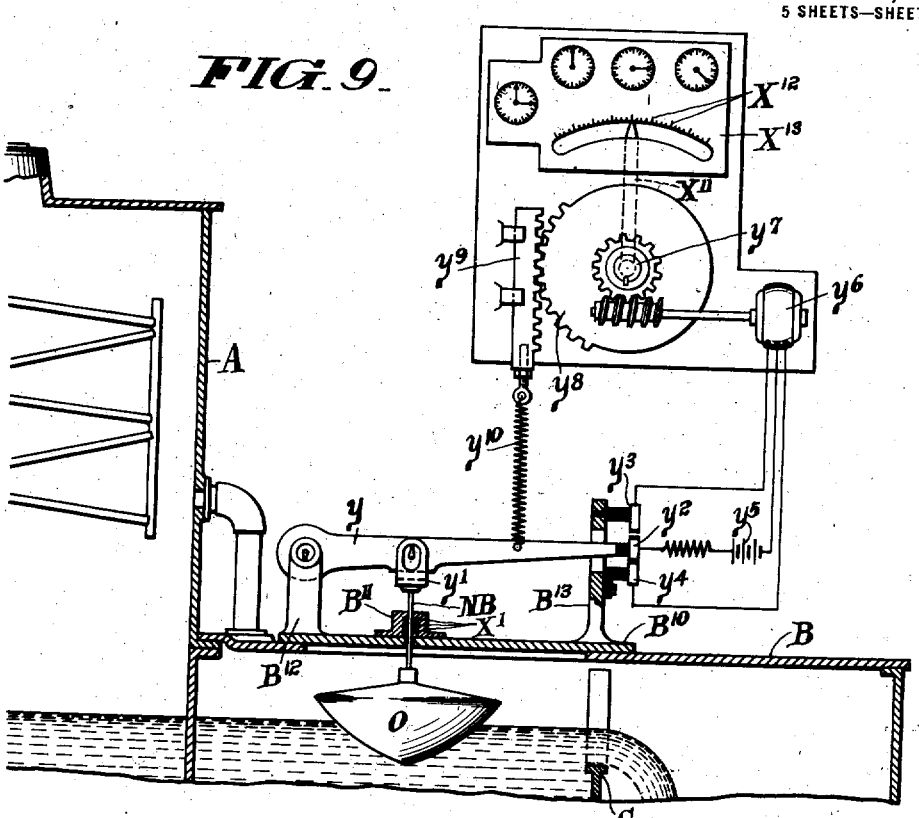
Figure 10:
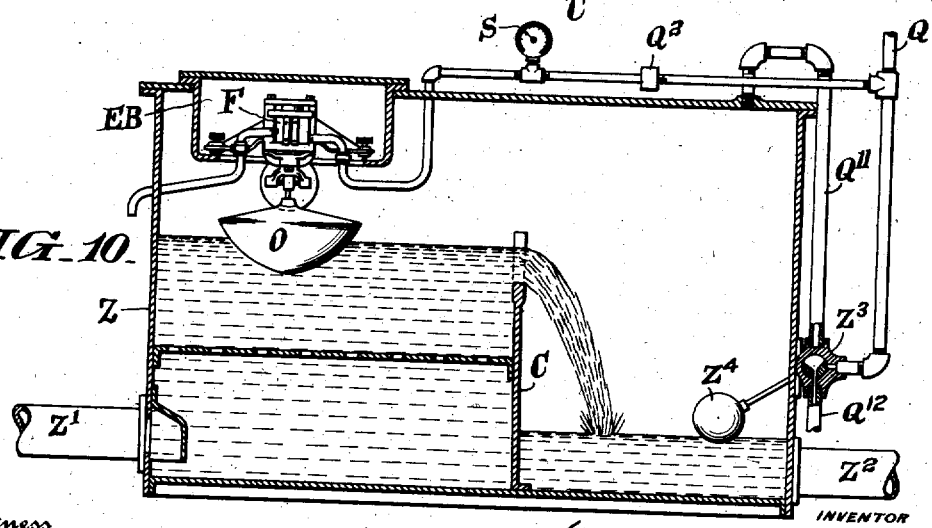

Of the drawings: Figure 1 is a diagrammatic representation, with parts shown in sectional elevation, of apparatus for measuring the flow of a liquid, as water, over a weir located in a weir chamber in which the vapor pressure may be above or below that of the atmosphere; Fig. 2 is a sectional elevation of a portion of the apparatus shown in Fig. 1; Fig. 3 is an elevation of another portion of the apparatus shown in Fig. 1; Fig. 4 is a plan of a portion of the apparatus shown in Fig. 1; Fig. 5 is a sectional elevation taken on the line 5—5 of Fig. 4, but on a larger scale than the latter figure; Fig. 6 is a partial sectional elevation of the apparatus shown in Fig. 5, taken on the line 6—6 of that figure, but on a larger scale than Fig. 5; Fig. 7 is a sectional elevation of a modified measuring apparatus; Fig. 8 is a view showing a portion of the apparatus shown in Fig. 7, taken similarly to Fig. 7 but on a larger scale; Fig. 9 is a somewhat diagrammatic representation, with parts in sectional elevation, of a third form of measuring apparatus; and Fig. 10 is an elevation partly in section of a fourth form of measuring apparatus.

The apparatus shown in Figs. 1 to 6 of the drawings comprises a water heater A of the open feed water type in which water is heated by the direct action of steam and in which a variable steam pressure prevails ranging ordinarily from a pressure slightly below or equal to the pressure of the atmosphere up to a pressure of ten or twenty pounds above atmospheric pressure. From the heater proper the water is discharged into a weir chamber B containing a weir C formed with one or more V-shaped discharge orifices C′, which, if there be more than one, have their apices at a common level. The vapor pressures in the heater A and weir chamber B are equalized by a conduit D open at its opposite ends to the two chambers above the water level in each.

In the apparatus disclosed in Figs. 1–6 the rate of flow is determined by measuring the flotative effect of the water at the supply side of the weir on a float O, which might be placed in the weir chamber on the supply side of the weir, but which for various reasons, I prefer to locate in a separate receptacle or casing E.

As shown in the drawings, the float chamber E is in the form of a cylindrical casing with an integral bottom and a removable cover E′.

$E^2$ represents a port adjacent the lower end of the cylindrical wall of the float chamber, and connected to the weir chamber B at the supply side of the weir and at a level below the weir notch level by pipe $E^3$.

A port $E^4$ formed in the wall of the float chamber adjacent its upper end is connected by a pipe $E^5$ to the weir chamber B above the water level therein. The upper portion of the float chamber is of larger diameter than the lower portion thus providing an annular shelf $E^6$ which is located above the highest water level which it is expected to have in the weir chamber and forms a support for the float and coöperating mechanism by which the flotative effect of the water on the float is balanced and measured. This mechanism comprises a vertical cylinder F having bolted to it two similar arms F′ and a third arm $F^2$. Each of the three arms F′, F′ and $F^2$ is provided at its outer end with a threaded vertical socket receiving an adjusting screw G which directly engages the shoulder $E^6$. The arms F′, F′ are each formed at their outer ends with knife edges $F^3$ adapted to impinge directly against the cylindrical wall of the float chamber and the arm $F^2$ is formed at its end with a flange $F^4$ into which is threaded a horizontal screw G′ having a sharpened end adapted to be forced into contact with the cylindrical wall of the float chamber. The supporting provisions described make it readily feasible to adjust the cylinder F vertically and to properly aline the cylinder and after the desired vertical adjustment and alinement is secured, to securely lock the cylinder F in place in float chamber E.

The upper and lower ends of the cylinder F are closed by diaphragms H and HA formed of flexible metal or other suitable material and are secured in place by clamping rings $F^5$ and externally threaded rings $F^6$ screwed into threaded annular extensions of the cylinder F. The disk-like projection K′ of a crosshead member K is clamped against the upper side of the diaphragm H by means of an internal washer $K^2$ and clamping screws $K^3$. The crosshead K is secured at its ends to the upper ends of a U-shaped yoke member L. The latter is formed with an aperture below, and alined with the cylinder F, which receives a member M formed with a disk-like head M′ clamped against the under side of the diaphragm HA by means of a washer $M^2$ and a clamping screw $M^3$. The body of the member M is externally threaded and is locked to the yoke-member L with a capacity for axial adjustment, by means of upper and lower clamping nuts $M^4$. To prevent an undesirable accumulation of water of condensation on the upper side of the diaphragm H, vent passages $F^7$ and $F^8$ are formed respectively in the upper clamping ring $F^5$, and in the adjacent portion of the cylinder F.

The cylinder F is interiorly divided into upper and lower compartments $f$ and $f^a$, respectively, by means of a transverse web or partition $F^9$ formed with a centrally disposed aperture having threaded into it a valve seat member $F^{11}$. The latter is formed with an axial port $F^{12}$ and a valve seat surrounding the lower end of the port. The port $F^{12}$ is controlled by a valve J adapted to move into and out of engagement with the seat formed on the underside of the valve seat member $F^{11}$. The latter is provided with a cylindrical depending flange $F^{13}$ extending nearly to the washer $M^2$, and when the port $F^{12}$ is opened, the fluid pressure in compartment $f^a$ causes water collecting in the compartment in any considerable amount to be forced through the port $F^{12}$ into the compartment $f$. The stem J′ of the valve J passes upward through the valve seat member and is provided between its ends with a shoulder $J^2$, and at its upper end is threaded to receive a nut or head $J^3$. The portion of the stem between the shoulder $J^2$ and the nut $J^3$ passes through a yoke member $J^5$. A coiled spring $J^4$, interposed between the nut $J^3$ and yoke member $J^5$, tends to hold the yoke and the valve stem in the position shown in which the yoke abuts against the shoulder $J^2$. The yoke member $J^5$ is provided with a stem $J^6$ having a lower threaded portion $J^7$ screwed into the crosshead extension K′ and another threaded portion $J^8$ at its upper end. A clamping nut $J^9$ screwed on the portion $J^8$ bears against the guide sleeve $K^4$ threaded into the crosshead K and locks the parts securely together. Adjustable screws $K^5$ and L′ are provided to positively limit the movement of the yoke and attached parts to the very small amount required to open and seal the port $F^{11}$.

The member M is formed with a threaded socket $M^5$ extending axially into it from its lower end. This socket receives the upper end of the stem N of the float O.

N′ represents a clamping nut for clamping the stem N and member M together in any desired adjustment. The stem N is engaged by a counter-balancing lever P which is fulcrumed in a bracket P′ secured to and depending from an extension $F^{14}$ of the cylinder F. As shown the lever P carries knife-edge pivot members $P^2$ and $P^3$ passing through and engaging the walls of apertures formed in the stem N and bracket P′ respectively. The lever P has a weight $P^4$ adjustably mounted on its free end. Preferably the counter-balancing lever P and its weight are arranged and adjusted to exactly balance the weight of the float O and the parts connected to it so that the only forces tending to move the diaphragms H and HA out of their normal positions are the lifting force of the water on the float O and the opposing thrust of the pressure fluid admitted to the cylinder F as hereinafter described. Advantageously the float O should be heavy enough so that it tends to hang vertically in the liquid in which it is more or less completely submerged as any side thrust due to the flotative action of the liquid is thereby avoided. Preferably I make the float hollow and of metal of such a character that its weight and contour are not affected by the conditions to which it is subjected in use.

The provision of the cylinder F of Figs. 1 to 6 with the opposed diaphragms H and HA make this form of balancing device entirely independent of the vapor pressure in the weir chamber. The counter-balancing function of the diaphragm HA closing the end of the compartment of the cylinder which is in free communication with the atmosphere is unnecessary of course, when the pressure in the weir chamber is equal to that of the atmosphere, but the presence of this diaphragm is in no wise prejudicial to the use of the apparatus in such case.

Preferably I so form the float O that the flotative effect exerted on it by the water admitted to the float chamber E bears a constant ratio to the flow over the weir as the water level on the supply side of the weir rises and falls. To accomplish this I arrange the float so that its lower end is at the weir notch apex level and shape the float so that the volume of water displaced by it varies as does the flow over the weir with changes in the height of water level on the supply side of the weir. With a weir having one or more V-shaped discharge notches or orifices the rate of flow is given by the equation $r=ah^{5/2}$, where $(r)$ is the rate of flow in suitable units, $(h)$, is the height of the water level on the supply side of the weir above the weir notch apex level, and $(a)$ is a constant, the value of which is fixed by the character of the weir notch or notches and by the relation between the units in which $(r)$ and $(h)$ are measured. In such case the float O should be so shaped that the volume $(v)$ of the portion of the float below a horizontal plane at any distance $(h)$ above the weir notch apex level is given by the equation $v=bh^{5/2}$, $(b)$ being a constant. From the two equations given above we see that the volume $(v)$ is equal to the rate of flow $(r)$ multiplied by a constant $\frac{b}{a}$ for all normal variations of the height $(h)$ of the water level on the supply side of the weir. The flotative effect or upward thrust exerted by the water on the float O is equal of course to the weight of the volume $(v)$ of water displaced by the float. While the peculiar contour which I give the float possesses the important advantage of making unnecessary other and in general more complicated and less satisfactory provisions for obtaining proportional readings in quantity units of flow, my invention in some of its aspects is not dependent upon giving the float any particular form. Those skilled in the art will readily understand how to vary the shape of the float O in order to obtain proportional readings of the flow over or through a weir having a different law of flow from that of the V-notched weir shown. The laws of flow for many forms of weirs, as for instance, a vertical weir having rectangular notches at its top, and a horizontal weir having circular discharge orifies formed through it, are already well known and moreover, the law of flow for any weir may be determined experimentally when necessary.

The provisions for balancing the lifting action of the water in the float O comprise means for automatically maintaining the proper fluid pressure in the lower compartment $f^a$ of the cylinder F. This I accomplish by connecting a pressure supply pipe Q to the compartment $f^a$. The pipe Q leads from a source of pressure, as for instance, the tank Q′ which may be supplied constantly, or from time to time, with some pressure fluid, as for instance, compressed air furnished by a compressor, not shown. The pipe Q includes a section $Q^2$ (see Fig. 2) in which is placed a diaphragm $Q^3$ formed with an orifice $Q^4$ restricted so that the flow through the orifice is comparatively slow, and so that the pressure on the outlet side of the orifice does not necessarily approximate the pressure on the supply side of the orifice. With this arrangement pressure fluid is constantly supplied to the compartment $f^a$ of the cylinder F. Whenever the pressure in the compartment $f^a$ becomes greater than is necessary to balance the lifting force exerted on the float O by the water in contact with it, the consequent slight downward movement of the diaphragm and connected parts causes the valve J to open the port $F^{12}$ allowing some of the pressure fluid to escape into the upper compartment *f* of the cylinder which is freely open to the atmosphere through the vent pipe R. Conversely, when the pressure in the lower compartment $f^a$ of the cylinder is less than that required to balance the lifting action of the water on the float, the valve J is moved to close the port $F^{12}$ and the pressure in the compartment $f^a$ at once builds up to the amount necessary to balance the flotative effect.

The pipe R is arranged to drain out of the compartment *f* any moisture collecting therein. The pipes Q and R or at least the portions of these pipes within the casing E may advantageously be made of lead or otherwise constructed to give them the slight flexibility required for the ready adjustment of the cylinder F with respect to the casing E.

With the apparatus described, the pressure in the lower compartment $f^a$ and in the portion of the pipe Q between the cylinder and the restricted orifice $Q^4$ is directly proportional to the quantity rate of flow over the weir and this rate of flow may be indicated by means of an ordinary pressure gage as for instance the gage S connected to the branch pipe $Q^5$. Similarly the flow may be integrated and recorded by a simple recording instrument comprising, as conventionally illustrated a drum T, rotated by a clock mechanism U, and a pencil T′ making a record on the drum T and moved parallel to the axis of the drum by the pressure in the pipe $Q^5$ acting in one direction against the piston $T^2$ working in the cylinder $T^3$ and also acted upon by the restoring spring $T^4$. Similarly, the flow may be integrated by a simple register of common kind. The register for this purpose, conventionally illustrated in Fig. 1, comprises a disk W, driven at a constant speed of rotation by a clock UA and engaged by the periphery of a small disk W′ carried by a shaft $W^2$, the axis of which intersects the axis of rotation of the disk W. The shaft $W^2$ is splined to the worm $W^3$ of a counting train $W^4$ and is moved toward and away from the center of the disk W by a cylinder $W^5$ and a piston $W^6$ working therein and acted on in one direction by the spring $W^7$, and in the opposite direction by the pressure in the pipe $Q^5$. A swivel connection $W^8$ (see Fig. 3) is placed between the stem $W^9$ of the piston $W^6$ and the disk W′.

In the modification illustrated in Figs. 7 and 8, AA represents the tank of a water heater provided with a steam supply pipe A′, a cold water supply pipe $A^2$ discharging onto water spreading baffles or trays $A^3$ located in the upper end of the tank. Beneath the trays $A^3$ there is located an inclined partition $A^4$ which forms the roof of a weir chamber $A^5$ formed within the tank AA. The gas or vapor pressures in the weir chamber $A^5$ and in the heating chamber proper are equalized by the hooded equalizing connection $A^7$. A channel $A^6$ is provided at one end of the weir chamber through which the water running down off the partition $A^4$ may pass to the underside of a filter bed $A^8$ extending across the bottom of the weir chamber at the supply side of the weir C.

In this modification the water flow over the weir C is measured by weighing the amount of water contained in a bucket member X located within the weir chamber $A^5$ and having a port in its bottom connected to the supply side of the weir C by a flexible pipe X′ which may be a rubber hose. The bucket X is advantageously made with its inner surface of exactly the same shape as the external surface of the float O, first described, and is arranged with the bottom of its cavity at the weir notch apex level. The bucket is supported by a spindle NA connected to the diaphragms of a cylinder FA which with its connected parts may be exactly like the cylinder F first described, except that in this case the valve member JA corresponding to the valve J in the construction first described, is on the upper side of the port connecting the two compartments $f^b$ and $f^c$ into which the cylinder is divided, and in this case the upper compartment $f^b$ is the compartment slowly supplied with compressed air or other pressure fluid through the pipe QA, while the outlet pipe RA leads from the lower compartment $f^c$. As shown, the cylinder FA is mounted in an annular support EA secured through a bracket $E^{10}$ to the side wall of the tank AA. $A^{12}$ represents the removable cover for an opening through which the cylinder FA and connected parts may be adjusted.

It will be readily apparent to those skilled in the art that with the internal surface of the bucket X shaped as described, the balancing pressure in the cylinder compartment $f^b$ will be exactly proportional to the amount of water flowing over the weir.

The operation of the bucket X is thus analogous to that of the float O first described since the function of each of these devices is to directly receive and transmit to the balancing and measuring provisions a force equal to the weight of a column of the liquid flowing over the weir which column extends from the weir notch apex level to the surface level of the liquid on the supply side of the weir, and varies in cross-section so that the weight of the column bears a constant ratio at all times to the weight of liquid flowing over the weir. With the construction shown in Figs. 7 and 8 the column of water thus weighed is received within the bucket X and directly weighed, while in the construction first described a corresponding column of water is displaced by the float and is indirectly weighed by measuring the flotative force exerted on the float O.

Since the weight rather than the volume of the liquid flowing over the weir is measured by the apparatus described herein, this apparatus has an inherent capacity for minimizing errors in measurement resulting from changes in temperature of the liquid flowing over the weir. For, while with a given height of surface level on the supply side of the weir the rate of flow over the weir in pounds per second decreases with the density of the liquid as the temperature of the latter rises, the weight of the column of water displaced by the float O or received in the bucket X also decreases as the density of the liquid decreases. While the bucket arrangement illustrated in Figs. 7 and 8 is, as I have indicated, an equivalent in a broad way for the float measuring mechanism of Figs. 1 to 6 and is intended to be generically claimed in this case, specific features of construction and arrangement shown in Figs. 7 and 8 are not claimed herein but are claimed in another application, Serial No. 746,280, filed by me February 5, 1913 as a division of an application filed by me on January 12, 1912 which has resulted in Patent No. 1096621, granted May 12, 1914.

While the fluid pressure means described forms a preferred means for balancing and measuring the water displaced by the float O or received by the bucket X, other balancing and measuring provisions may be employed, and in Fig. 9 I have shown one example of a modification in this respect. In Fig. 9, B, represents a weir chamber attached to the side of a heater tank A and divided into inlet and outlet compartments by a notched weir C, and O represents a float similar to that first described and located in the weir chamber on the supply side of the weir with its bottom at the weir notch apex level. The float O is carried by a slender stem NB which extends through a cover plate $B^{10}$ normally closing an aperture in the top of the weir chamber B, suitable means, such as the labyrinth packing $B^{11}$ being provided to prevent leakage along the stem. At its upper end the stem NB is connected to a yoke Y′ pivotally connected to a beam Y fulcrumed in a bracket $B^{12}$ carried by the cover plate $B^{10}$. The free end of the lever Y is shown as working in a slotted bracket $B^{13}$ and carries a contact $Y^2$ adapted to engage the stationary contacts $Y^3$ and $Y^4$, shown as carried by the bracket $B^{12}$, accordingly as the free end of the beam Y moves up or down from a neutral position. The contacts $Y^3$, $Y^2$ and $Y^4$ are connected by suitable conductors to the three terminals of a motor $Y^6$. The conductor running from the motor to the contact $Y^2$ includes a source of current, conventionally indicated at $Y^5$. The shaft of the motor $Y^6$ is geared to a shaft $Y^7$ on which is mounted a gear wheel $Y^8$ meshing with a rack bar $Y^9$ which has one end connected to the lever Y by the spring $Y^{10}$.

The motor is of such a character that when the fall in level of the water on the supply side of the weir results in moving the lever Y into the position in which the contact $Y^2$ engages the contact $Y^4$, the motor $Y^6$ will be set into rotation in the direction to elevate the rack bar $Y^9$ until the increased tension of the spring $Y^{10}$ is sufficient to move the contact $Y^2$ into its normal neutral position. Conversely, when the increase in height of water level on the supply side of the weir results in moving the contact $Y^2$ into engagement with the contact $Y^3$, the motor turns in the opposite direction to decrease the tension of the spring $Y^{10}$. It will be apparent without further explanation that the tension of the spring $Y^{10}$ will be inversely proportional to the flow of water over the weir and that the angular position of the gear wheel $Y^8$ and of the shaft $Y^7$ at any instant will be proportional to the spring tension. An arm $X^{11}$ secured to the shaft $Y^7$ and playing over a suitably graduated dial $X^{12}$ thus furnishes a visual indication of the amount of water flowing over the weir and this arm $X^{11}$ may be readily employed to adjust in a known manner, the connection between the clock driving mechanism and the counting wheels proper of a register $X^{13}$ in order to integrate the quantity of water flowing over the weir during a given period.

The particular means employed in Fig. 9 for adjusting a balancing force, while novel with me, is not claimed herein as similar mechanism is described and claimed in my prior copending application, Serial No. 605,878, filed February 1, 1911.

The apparatus shown in Fig. 9 is open to the objection, not experienced with the apparatus shown in Figs. 1 to 8, that errors are introduced by variations in pressure within the weir chamber because of the unbalanced pressure action on the stem NB passing through the top wall of the weir chamber. However, the cross-section of this stem may be made small enough so that this error is negligible under many conditions.

The measuring apparatus constructed in accordance with the principles hereinbefore described may be employed for other purposes than those hereinbefore referred to, for instance, this apparatus is readily available for measuring the flow of liquid through a closed conduit, such as a pipe line transmitting water or oil or the like, as by the arrangement shown in Fig. 10. In the latter figure Z represents a weir chamber interposed between pipe sections $Z'$ and $Z^2$ transmitting oil, water or other liquid under pressure; the liquid flowing into the weir chamber through the pipe section $Z'$ and passing out through the pipe section $Z^2$. O represents a float of the special configuration hereinbefore described which is arranged on the supply side of the notched weir C with the bottom of the float at the weir notch apex level. The float O is connected to a cylinder F, which, with its connected parts may be identical with the cylinder F and attached parts of Figs. 1 to 6. The cylinder F is mounted in a support EB forming a removable part of the top wall of the weir chamber. To prevent the level of the liquid from rising on the outlet side of the weir C to an extent sufficient to interfere with the flow of the liquid over the weir I provide means for injecting a permanent gas, as ordinary atmospheric air, into the weir chamber. As shown, this means comprises a valve $Z^3$ operated by a float $Z^4$ located within the weir chamber on the outlet side of the weir and rising and falling with the liquid level on that side of the weir. The valve $Z^3$ is adapted, on a predetermined elevation of the float $Z^4$, to connect the compressed air supply pipe Q to a branch pipe $Q^{11}$ which opens to the weir chamber at the upper end of the latter. Similarly on a predetermined fall of the float $Z^4$ the valve $Z^3$ is operated to connect the pipe $Q^{11}$ to a vent pipe $Q^{12}$. With this arrangement the valve $Z^3$ automatically regulates the vapor pressure in the weir chamber to the extent required to prevent an undesirable accumulation of liquid on the supply side of the weir, while at the same time the pressure is kept down to a point where it does not interfere with the proper flow of liquid through the weir chamber.

While in accordance with the provisions of the statutes I have illustrated and described the best forms of my invention now known to me, it will be apparent to those skilled in the art that under some conditions certain features of my invention may be used with advantage without a corresponding use of other features, and that changes may be made in the form of the apparatus disclosed without departing from the spirit of my invention. In particular it is to be understood that neither the form nor the mode of support of the fluid pressure balancing mechanism disclosed form essential features of my invention in its broader aspects.

Having now described my invention what I claim as new and desire to secure by Letters Patent is:

1. Liquid flow measuring apparatus comprising in combination a weir over which the liquid to be measured flows, a member having a surface in contact with the liquid flowing over the weir at and below the surface level of the liquid on the supply side of the weir, and a weighing mechanism connected to and balancing said member and adapted to maintain the latter in a substantially stationary position notwithstanding variations in said thrust, said member having its contacting surface so shaped that the thrust imparted to the member by the liquid will bear a constant ratio to the amount of liquid flowing over the weir as said surface level rises and falls.

2. Liquid flow measuring apparatus comprising in combination a weir over which the liquid to be measured flows, a weighing mechanism, and a member connected to and balanced by said mechanism and having a surface in contact with the liquid flowing over the weir at and below the surface level of the liquid on the supply side of the weir and being so shaped that the thrust imparted to the member by the liquid in contact therewith will bear a constant ratio to the amount of liquid flowing over the weir as said surface level rises and falls.

3. Liquid flow measuring apparatus comprising in combination a weir over which the liquid to be measured flows, a float in contact with the liquid flowing over the weir at and below the surface level of the liquid on the supply side of the weir, and a weighing mechanism connected to and balancing said float, the latter being so shaped that the variable quantity of liquid displaced by the float as the surface level of the liquid rises and falls is proportional to the rate of flow over the weir.

4. Flow measuring apparatus comprising in combination a receptacle containing a liquid the height of surface level of which is a function of but is not directly proportional to the rate of flow to be measured, a float subjected to the flotative force of the liquid, and a weighing mechanism connected to and balancing said float and adapted to maintain the latter in a substantially stationary position notwithstanding variations in said force, said float being so shaped that the variable quantity of liquid displaced by it as the surface level of the liquid rises and falls is proportional to the rate of flow.

5. Liquid flow measuring apparatus comprising in combination a weir over which the liquid to be measured flows, a substantially stationary member having a surface in contact with the liquid flowing over the weir between the actual level of the liquid surface on the supply side of the weir at any instant, and the lowermost level of the last mentioned surface at which liquid will flow over the weir, and so shaped that said member receives a thrust from the contacting liquid bearing a constant ratio to the amount of liquid flowing over the weir as the level of said liquid surface rises and falls, fluid pressure means for balancing said thrust including a pressure chamber in which the pressure varies proportionally to said thrust, and means for measuring said pressure.

6. Flow measuring apparatus comprising in combination a receptacle containing a liquid the height of surface level of which is a function of the rate of flow to be measured, a substantially stationary float subjected to the varying flotative force of the liquid as the surface of the latter rises and falls, means for impressing a force on said float equal but opposite in direction to said flotative force, said means including a pressure chamber and means for maintaining a fluid pressure in said chamber proportional to said flotative force, and means for measuring said fluid pressure.

7. Flow measuring apparatus comprising in combination a receptacle containing a liquid the height of surface level of which is a function of, but is not directly proportional to the rate of flow to be measured, a substantially stationary float subjected to the flotative force of the liquid and so shaped that the variable quantity of liquid displaced by the float as the surface level rises and falls is proportional to the rate of flow, means for impressing a force on said float equal but opposite in direction to said flotative force, said means including a pressure chamber and means for maintaining a fluid pressure in said chamber proportional to said flotative force, and means for measuring said fluid pressure.

8. In flow measuring apparatus the combination of a cylinder formed with a partition dividing the cylinder into two compartments, diaphragms closing the ends of the cylinder, a member, means operatively connecting said member to the two diaphragms, and acted upon by the fluid flowing, provisions for maintaining a constant fluid pressure in one of said compartments, and means automatically responsive to the force exerted on said member by the fluid flowing for maintaining a pressure in the other compartment sufficient to balance said force.

9. In flow measuring apparatus, the combination of a cylinder formed with a partition dividing the cylinder into two compartments, diaphragms closing the ends of the cylinder, a member, means operatively connecting said member to the two diaphragms and acted upon by the fluid flowing, provisions for maintaining a constant fluid pressure in one compartment, means automatically responsive to the force acting on said member by the fluid flowing for maintaining a pressure in the other compartment sufficient to balance said force, said means comprising a discharge connection from, and a pressure fluid supply connection to said other compartment, one of said connections being restricted, and a valve responsive to the movements of said member and controlling the other connection.

10. In flow measuring apparatus the combination of a float chamber, a vertical cylinder mounted in said chamber and formed with a partition dividing the cylinder into upper and lower compartments, diaphragms closing the ends of the cylinder, a float, means operatively connecting said float to the two diaphragms, provisions for maintaining a constant fluid pressure in the upper compartment, and means automatically responsive to the flotative force acting on said float for maintaining a pressure in the lower compartment sufficient to balance said force.

11. In a flow measuring apparatus the combination of a float chamber, a vertical cylinder mounted in said chamber and formed with a partition dividing the cylinder into upper and lower compartments, diaphragms closing the ends of the cylinder, a float, means operatively connecting said float to the two diaphragms, provisions for maintaining a constant fluid pressure in the upper compartment, and means automatically responsive to the flotative force acting on said float for maintaining a pressure in the lower compartment sufficient to balance said force, said means comprising a discharge connection and a pressure fluid supply connection to said lower compartment, one of said connections being restricted, and a valve responsive to the movements of said float controlling the other connection.

12. Flow measuring apparatus comprising a cylinder provided with three or more vertically adjustable support engaging members and with three or more horizontal support engaging devices, a support provided with a horizontal shelf or shoulder on which said vertically adjustable members rest and provided also with a shoulder at an angle to said horizontal shelf against which said horizontal support engaging devices bear, and provisions for adjusting one of the latter to clamp the cylinder in place, a member operatively connected with said cylinder and suspended in position to receive a thrust responsive to the flow to be measured, and automatic provisions for regulating the admission to and exhaust from said cylinder of pressure fluid to balance said thrust.

13. Flow measuring apparatus comprising a cylinder having three or more lateral arms provided each with sharpened means adapted to engage a corresponding supporting surface and provided each with a vertically adjustable support engaging member, a support provided with a horizontal shelf on which said support engaging members rest, and with a cylindrical surface against which said sharpened means impinge, one of said sharpened means being adjustable toward and away from the cylinder whereby the cylinder may be clamped in place, a liquid engaging member operatively connected to said cylinder and adapted to receive a vertical thrust responsive to the rate of flow, and automatic provisions regulating the admission to and exhaust from said cylinder of pressure fluid to balance the thrust exerted on said member.

14. In flow measuring apparatus the combination with a closed chamber, of a member located within said chamber and acted upon by the fluid flowing, and fluid pressure means for measuring the thrust imparted to said member by the fluid flowing, comprising a compartment located within said chamber and having a movable wall, means for maintaining a variable pressure within said compartment proportional to the thrust exerted on said member, and means for balancing the pressure exerted on the outer side of said wall comprising a second compartment located within said chamber and having a movable wall and provisions for maintaining a constant pressure in said second compartment, and an operative connection between said member and both of said movable walls.

15. The combination with a liquid containing receptacle, of a float acted upon by the liquid in said receptacle, and fluid pressure means for balancing the flotative effect on said float of the liquid, comprising a compartment having a movable wall, means for maintaining a variable pressure within said compartment proportional to said flotative effect and means for balancing the pressure exerted on the outer side of said wall, comprising a second compartment having a movable wall, provisions for maintaining a constant pressure in said second compartment, and an operative connection between said member and both of said movable walls.

16. The combination with a liquid containing receptacle, of a member adapted to be acted upon by the liquid therein, and fluid pressure means for balancing the thrust imparted to said member by said liquid comprising a compartment having a movable wall, means for maintaining a variable pressure within said compartment proportional to the thrust exerted on said member, means for balancing the pressure exerted on the outer side of said wall comprising a second compartment having a movable wall and provisions for maintaining a constant pressure within said second compartment, and an operative connection between said member and both of said movable walls.

17. In combination a cylinder formed with a partition transverse to the length of the cylinder and dividing the latter into two compartments, diaphragms closing the ends of the cylinder, means operatively connecting the two diaphragms for simultaneous movements, and means for maintaining a fluid pressure in one of said compartments adapted to balance the action of a force tending to move said diaphragms in a direction decreasing the volume of said compartment, said means comprising a valve actuated by the movements of said diaphragms, a pressure fluid supply connection and a vent connection, one of said connections being restricted and the other being controlled by said valve.

GEORGE H. GIBSON.